United States Patent [19]
Osterloff et al.

[11] 3,831,695
[45] Aug. 27, 1974

[54] ALL-WHEEL DRIVE FOR MOTOR VEHICLES

[75] Inventors: Kurt Osterloff, Friedrichshafen-Manzell; Georg Ruhrenschopf, Friedrichshafen, both of Germany

[73] Assignee: Zahnradfabrik Friedrichshafen AG, Friedrichshafen, Germany

[22] Filed: Aug. 8, 1973

[21] Appl. No.: 386,498

[30] Foreign Application Priority Data
Aug. 8, 1972 Germany.................... 2238976

[52] U.S. Cl. ............ 180/44 R, 74/750 R, 180/70 R
[51] Int. Cl. ........................................... B60k 17/04
[58] Field of Search .... 180/43 A, 43 B, 43 R, 44 R, 180/44 F, 44 M, 44 E, 45–50, 70 R; 74/393, 394, 660, 674, 694, 695, 750

[56] References Cited
UNITED STATES PATENTS

| | | | |
|---|---|---|---|
| 2,516,850 | 8/1950 | Brownyer | 74/695 |
| 2,851,117 | 9/1958 | Harris | 180/70 R X |
| 2,959,237 | 11/1960 | Hill | 180/44 R |
| 3,407,893 | 10/1968 | Hill et al. | 180/44 R |
| 3,756,095 | 9/1973 | McCay, Jr. et al. | 180/43 R X |
| 3,780,601 | 12/1973 | Dach et al. | 74/750 R X |

FOREIGN PATENTS OR APPLICATIONS

| | | | |
|---|---|---|---|
| 728,206 | 4/1955 | Great Britain | 180/44 R |

*Primary Examiner*—Lloyd L. King
*Assistant Examiner*—Andres Kashnikow
*Attorney, Agent, or Firm*—Karl F. Ross; Herbert Dubno

[57] ABSTRACT

A planetary-gear train of an automotive transmission, in tandem with a speed changer of the shiftable-gear type, has a ring gear adapted to be locked either to an associated planet carrier or to a stationary housing to vary the speed ratio between the planet carrier and the driven shaft of the speed changer. The planet carrier is rigid with a spur gear driving the drum of a differential gearing with two output shafts, one of the latter being selectively connectable with the housing to make the two output shafts run in unison.

10 Claims, 3 Drawing Figures

ALL-WHEEL DRIVE FOR MOTOR VEHICLES

FIELD OF THE INVENTION

Our present invention relates to an automotive transmission, especially one designed for vehicles with all-wheel drive, in which the torque of an engine is split between a pair of shafts of a dual wheel with the aid of a differential gearing which is coupled to the engine by way of a speed changer.

OBJECTS OF THE INVENTION

The general object of our present invention is to provide, in a transmission of this type, a highly compact assembly including a speed changer and one or more interwheel differentials individual to respective pairs of wheel shafts.

Another object is to provide an assembly of this nature affording a wide selection of different speed ratios.

SUMMARY OF THE INVENTION

These objects are realized, pursuant to our present invention, by combining a conventional speed changer of the shiftable-gear type with a planetary-gear train in tandem therewith, this planetary-gear train including the usual trinity of input member (e.g. sun gear), output member (e.g. planet carrier) and third member (ring gear); the speed ratio of the output member of this train with reference to the input member (and therefore to the driven shaft of the speed changer positively connected thereto) is variable by control means engageable with the third member, as by a coupling mechanism which alternately locks the ring gear to either the sun gear or a stationary housing part. This output member, in turn, drives the associated interwheel differential or differentials through a toothed-wheel connection, advantageously through one or more spur gears the last of which meshes with peripheral teeth on a rotating drum which acts as the differential housing. The first spur gear may be permanently joined to the output member of the planetary-gear train, specifically to the planet carrier thereof, or may be detachably screwed onto same.

BRIEF DESCRIPTION OF THE DRAWING

The above and other features of our invention will now be described in detail with reference to the accompanying drawing in which.

SPECIFIC DESCRIPTION

Figure 1:
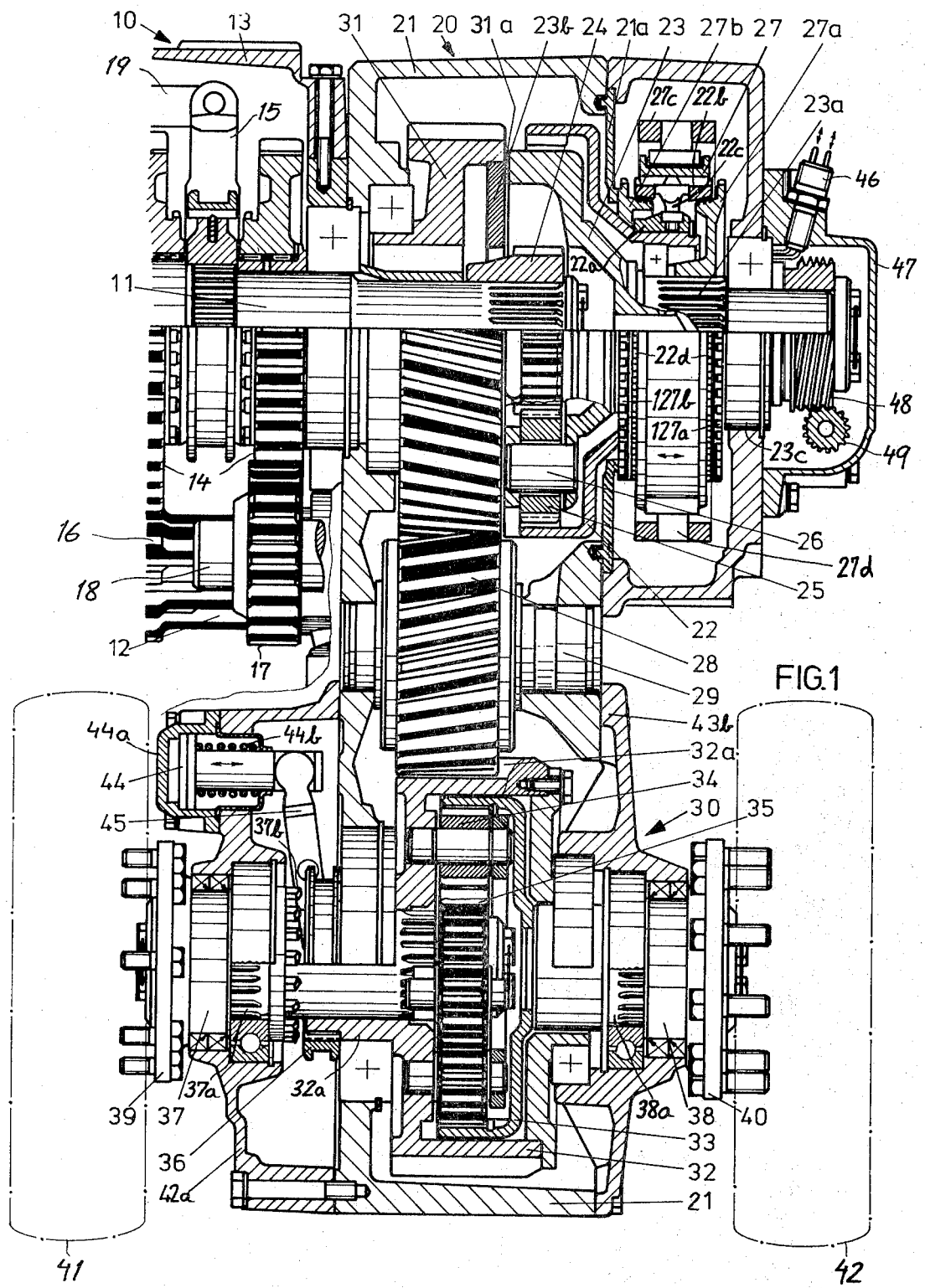
FIG. 1 is a partly sectional view of a portion of an automotive transmission according to our invention serving to drive one pair of the dual wheels of a motor vehicle.

The assembly shown in FIG. 1 serves to drive a pair of dual wheels 41, 42 (indicated diagrammatically), at the rear of a jeep or other vehicle with all-wheel drive, from a nonillustrated engine. This assembly is, of course, symmetrically duplicated for the other pair of dual rear wheels and is a branch of an otherwise conventional transmission also powering the front wheels and, possibly, a further set of wheels of the vehicle.

The assembly comprises three major components, i.e. a partly illustrated speed changer 10 of the shiftable-gear type, a planetary-gear unit 20, and an interwheel differential 30 with two coaxial shafts 37, 38 carrying hubs 39, 40 for the wheels 41, 42. Speed changer 10 comprises a nonillustrated drive shaft powered by the engine, a driven shaft 11 and an ancillary shaft 12 journaled in the housing 13, shaft 11 carrying a set of gears 14 which are axially shiftable by means of a fork 15 for selective engagement with a coacting set of gears 16 on shaft 12 and with a reversing gear 17 on an auxiliary shaft 18. Fork 15 is linked via an arm 19 with a similar fork on the opposite side of the vehicle and with a common control lever therefor (not shown) as is well known per se.

The planetary unit 20, whose housing 21 is screwed onto the housing 13 of speed changer 10, comprises a sun gear 24 rigid with the driven shaft 11 of the speed changer, a ring gear 22 coaxial with that shaft but freely rotatable with reference thereto, and a planet carrier 23 supporting a set of pinions 25 (only one shown) by means of stub shafts 26. Each pinion 25 meshes on the one hand with the sun gear 24 and on the other hand with the ring gear 22. The latter has a hub consisting of two concentric rings 22a, 22b interconnected by bolts 22c, the outer ring 22b riding via antifriction bearings on confronting frustoconical flanges of a pair of coupling elements 27a and 27b. Element 27a positively engages a splined extension 23a of a planet carrier 23 which is journaled in a bearing 23c; element 27b is rigid with housing 21.

Ring 22b has peripheral teeth 22d flanked by similar teeth 127a, 127b of coupling elements 27a and 27b. A sleeve 27, with internal serrations engaging the teeth 22d, is axially slidable on ring 22b for alternately connecting the ring gear 22 with either of the two coupling elements 27a, 27b by selective engagement of its serrations with the teeth 127a or 127b thereof. The shifting of sleeve 27 is carried out, under the control of a nonillustrated selector lever, with the aid of a pneumatic or hydraulic jack (not shown) to which working fluid is supplied by way of a fitting 46 on housing 21. The jack is attached to a nonrotating control ring 27c with guide shoes 27d slidably received in a peripheral groove of the sleeve.

The illustrated intermediate position of sleeve 27 allows the ring gear 22 to spin freely so that planet carrier 23 will not transmit any driving torque to a load; this is, accordingly, the neutral or idling position. If the sleeve is shifted to the right, it unites the planet carrier and the ring gear so that all three members 22 – 24 of gear train 20 will rotate in unison, this train having then a speed ratio of 1 : 1. A leftward shift of sleeve 27 immobilizes the ring gear 22, causing the planet carrier 22 to rotate at a reduced speed with reference to driven shaft 11.

A cap 47 on housing 21, supporting the fitting 46, surrounds a worm 48 rigid with planet carrier 23, this worm meshing with a worm gear 49 driving some ancillary equipment such as a pump for lubricating oil.

Planet carrier 23 is joined to a spur gear 31, journaled coaxially therewith in housing 21, by a welding seam 31a and a guide disc 23b; seam 31a is advantageously produced by an electron beam. Spur gear 31 meshes with a similar gear 28 on a fixed axle 29, gear 28 in turn engaging a set of peripheral teeth 32a on a rotating drum 32 acting as a housing for interwheel differential 30. This differential further comprises internal gearing within drum 32, including a sun gear 35 and planetary pinions 34 in mesh therewith and with a ring gear 33. Wheel shafts 37 and 38 are positively coupled with ring gear 33 and sun gear 35, respectively, for entrainment thereby.

The lower part of housing 21, forming an enclosure for the differential 30, has cheecks 43a, 43b in which the shafts 37 and 38 are journaled. Cheek 43a also supports a pneumatic or or hydraulic cylinder 44a in which a piston 44 is slidable against the force of a spring 44b to displace a lever 45 which, through a nonillustrated fork, engages a coupling sleeve 36 slidably but nonrotatably mounted on a peripherally toothed trunnion 32a of drum 32. Sleeve 36' is thus shiftable to the left, from its illustrated normal position, into positive engagement with a set of teeth 37b on a splined head 37a of shaft 37 engaging the hub 39, a similar head 38a (but without clutch teeth) being provided on shaft 38 for engagement with hub 40. By this coupling operation, controlled by the driver via a nonillustrated actuator, the two wheel shafts 37 and 38 are effectively interconnected for rotation in unison, with suppression of the differential action of gearing 30.

Figure 2:
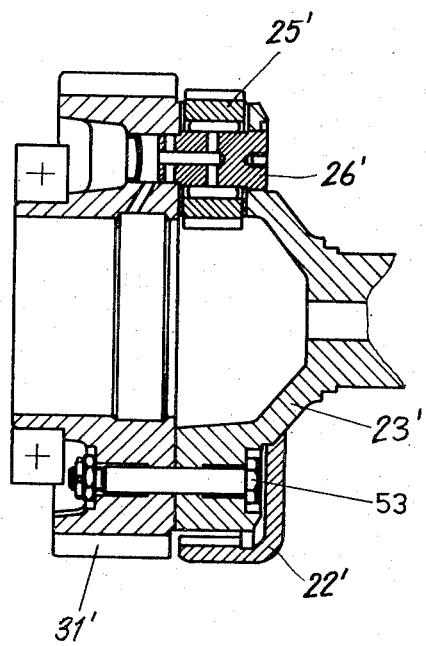
FIG. 2 is a fragmentary sectional view of a modified part of the assembly of FIG. 1.

As illustrated in FIG. 2, a planet carrier 23' with pinions 25' on shafts 26' may be detachably joined to a spur gear 31' with the aid of screws 53, these screws passing through the planet carrier at locations angularly offset from the pinion shafts 26'.

Figure 3:
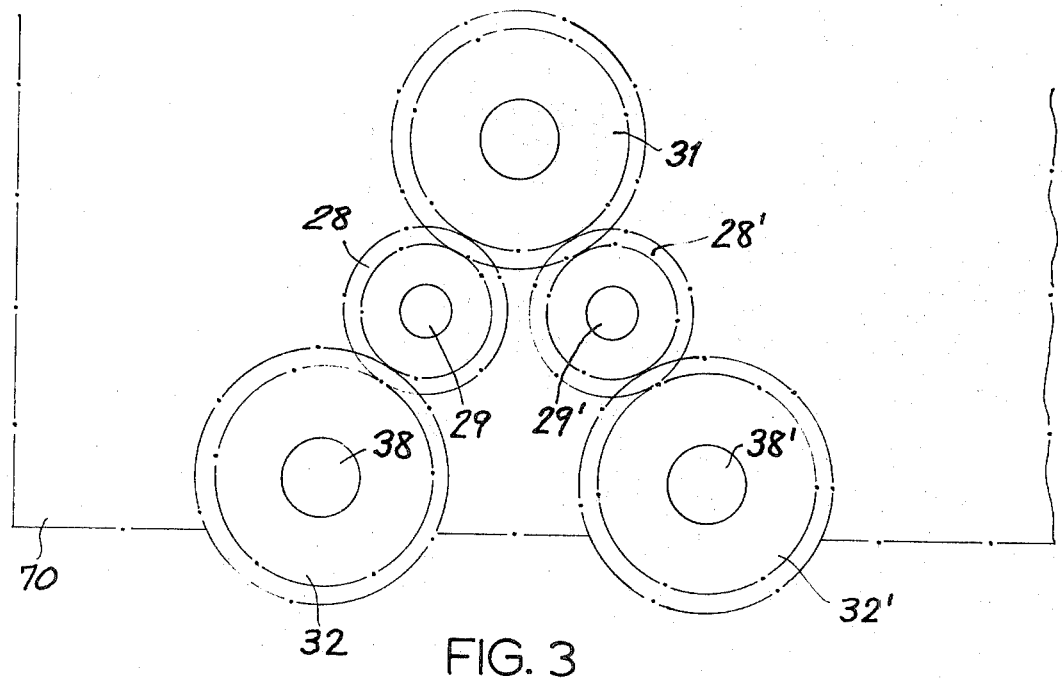
FIG. 3 is a diagrammatic side-elevational view of the transmission of FIG. 1 expanded to drive two pairs of dual rear wheels on adjoining axles.

In FIG. 3 we have illustrated the use of the system of FIG. 1 to drive adjacent wheel pairs on parallel rear-wheel axles of a three-axle vehicle. Spur gear 31 meshes with a second gear 28', similar to gear 28, on an axle 29'; gear 28', in turn, engages another peripherally toothed differential housing 32' whose outer wheel shaft is shown at 38'. Unit 20, therefore, serves as a group drive for two pairs of dual wheels on the same side of the vehicle partly indicated at 70.

We claim:

1. An automotive transmission for differentially driving at least one pair of coaxial vehicle wheels from an engine, comprising:
    an engine-powered speed changer with shiftable gear means operatively coupled to a driven shaft;
    a planetary-gear train including an input member positively connected to said driven shaft, an output member, and a third member;
    control means engageable with said third member for varying the speed ratio between said input and output members;
    a differential gearing with a rotatable drum, a pair of wheel shafts coaxially projecting from said drum and internal gear means coupling said drum to said wheel shafts; and
    a toothed-wheel connection between said output member and said drum.

2. A transmission as defined in claim 1 wherein said output member is a planet carrier and wherein said toothed-wheel connection includes a spur gear coaxial with said planet carrier.

3. A transmission as defined in claim 2 wherein said input member is a sun gear and said third member is a ring gear, said planet carrier being provided with pinions engaged by said sun and ring gears, said control means further comprising mechanism for alternately locking said ring gear to said sun gear and to a stationary housing part.

4. A transmission as defined in claim 2 wherein said spur gear and said planet carrier are welded to each other.

5. A transmission as defined in claim 2 wherein said spur gear and said planet carrier are screw-connected with each other.

6. A transmission as defined in claim 2 wherein said drum is provided with external peripheral teeth forming part of said toothed-wheel connection.

7. A transmission as defined in claim 6 wherein said toothed-wheel connection further includes an intermediate gear meshing with said spur gear and with said peripheral teeth.

8. A transmission as defined in claim 7 wherein said intermediate gear is one of a pair of intermediate gears in mesh with said spur gear, further comprising a second differential gearing having an externally toothed drum engaged by the second intermediate gear.

9. A transmission as defined in claim 8 wherein said differential gearings are centered on two adjoining rear axles of the vehicle.

10. A transmission as defined in claim 1, further comprising clutch means selectively operable to positively connect one of said output shafts with said drum.

* * * * *